United States Patent
Nie et al.

(10) Patent No.: US 11,971,634 B2
(45) Date of Patent: Apr. 30, 2024

(54) DEVICE FOR THE REGULATION OF LIGHT TRANSMISSION

(71) Applicant: Merck Patent GmbH, Darmstadt (DE)

(72) Inventors: Chuan Nie, De Veldhoven (NL); Ties De Jong, De Veldhoven (NL); Johan Osenga, De Veldhoven (NL)

(73) Assignee: MERCK PATENT GmbH, Darmstadt (DE)

( * ) Notice: Subject to any disclaimer, the term of this patent is extended or adjusted under 35 U.S.C. 154(b) by 34 days.

(21) Appl. No.: 17/777,845

(22) PCT Filed: Nov. 24, 2020

(86) PCT No.: PCT/EP2020/083111
§ 371 (c)(1),
(2) Date: May 18, 2022

(87) PCT Pub. No.: WO2021/105070
PCT Pub. Date: Jun. 3, 2021

(65) Prior Publication Data
US 2022/0413344 A1    Dec. 29, 2022

(30) Foreign Application Priority Data
Nov. 27, 2019    (EP) .................................. 19211729

(51) Int. Cl.
*G02F 1/1343*    (2006.01)
*G02F 1/1337*    (2006.01)
(Continued)

(52) U.S. Cl.
CPC ........ *G02F 1/134327* (2013.01); *G02F 1/137* (2013.01); *B23K 26/402* (2013.01); *G02F 1/1337* (2013.01); *G02F 2202/16* (2013.01)

(58) Field of Classification Search
CPC .. G02F 1/134327; G02F 1/137; G02F 1/1337; G02F 2202/16; B23K 26/402
(Continued)

(56) References Cited

U.S. PATENT DOCUMENTS 3,588,225 A    6/1971   Nicastro
4,624,531 A *  11/1986  Wada ................... G02F 1/13725
                                                    349/129
(Continued)

FOREIGN PATENT DOCUMENTS

EP    2840442 A1    2/2015
JP    5486236 A     7/1979
(Continued)

OTHER PUBLICATIONS

Baetens et al., "Properties, requirements and possibilities of smart windows for dynamic daylight and solar energy control in buildings: A state-of-the-art review", Solar Energy Materials & Solar Cells, 94, (2010), pp. 87-105.
(Continued)

*Primary Examiner* — Charles S Chang
(74) *Attorney, Agent, or Firm* — BUCHANAN INGERSOLL & ROONEY

(57) ABSTRACT

Disclosed is a device for the regulation of light transmission. In particular, switchable windows and methods for their preparation are disclosed. The switchable windows include electrically switchable devices which in one optical switching state are capable of portraying closed patterns or images without the need for providing complex electrical contacting.

13 Claims, 3 Drawing Sheets

(51) Int. Cl.
   *G02F 1/137*   (2006.01)
   *B23K 26/402*  (2014.01)
(58) Field of Classification Search
   USPC .......................................................... 349/158
   See application file for complete search history.

(56) References Cited

U.S. PATENT DOCUMENTS

| | | | |
|---|---|---|---|
| 10,114,264 B2 | 10/2018 | Junge et al. | |
| 2005/0001959 A1* | 1/2005 | Chang ............... | G02F 1/133555 349/114 |
| 2015/0055076 A1* | 2/2015 | Iwamoto ........... | G02F 1/134327 349/139 |
| 2016/0062157 A1* | 3/2016 | Kim .................... | C09K 19/544 445/24 |

FOREIGN PATENT DOCUMENTS

| | | | |
|---|---|---|---|
| JP | 55547 A | 1/1980 | |
| WO | 2014135240 A2 | 9/2014 | |
| WO | 2015095615 A1 | 6/2015 | |
| WO | 2016116120 A1 | 7/2016 | |

OTHER PUBLICATIONS

International Search Report and Written Opinion for International Application No. PCT/EP2020/083111, dated Feb. 24, 2021, 9 pages.

* cited by examiner

DEVICE FOR THE REGULATION OF LIGHT TRANSMISSION

CROSS-REFERENCE TO RELATED APPLICATIONS

This is the national phase of International Application No. PCT/EP2020/083111, filed Nov. 24, 2020, which claims priority to European Application No. 19211729.9, filed Nov. 27, 2019. The disclosure of each of these applications is incorporated herein by reference in its entirety for all purposes.

FIELD OF THE INVENTION

The present invention relates to devices for the regulation of light transmission and in particular switchable windows and to methods for their preparation. The present invention in particular relates to electrically switchable devices which in one optical state are capable of portraying closed patterns or images without the need for providing complex electrical contacting.

BACKGROUND OF THE INVENTION

Devices for controlling or modulating the transmission of light are commonly used in display applications, but they may also be used e.g. in so-called smart windows applications. R. Baetens et al. in "Properties, requirements and possibilities of smart windows for dynamic daylight and solar energy control in buildings: A state-of-the-art review", Solar Energy Materials & Solar Cells, 94 (2010) on pages 87-105 review different dynamic smart windows. As described therein, smart windows can make use of several technologies for modulating the transmittance of light such as devices based on electrochromism, liquid crystal devices and electrophoretic or suspended-particle devices.

Light shutters and optical intensity modulators, in particular liquid crystal-based light modulators, may be used in switchable windows for architectural, automotive, railway, avionic and nautical applications.

Light modulating or regulating devices may in principle rely on the absorption of light or the scattering of light or a combination of both.

In some devices the transmission of light can be reversibly changed wherein the intensity of incident light can be attenuated, dimmed or tinted. Such devices may thus be operated in and switched between a bright state and a dark state, i.e. between a state of relatively higher light transmission and a state of relatively lower light transmission.

In other cases a scattering-type device may be used to change the transmission of light by switching between a transparent non-scattering state, i.e. an optically clear or non-hazy state, and a light scattering state, i.e. a translucent or hazy state, which may also be perceived or appear as cloudy, turbid, diffuse or opaque. A device operating in the scattering mode can in particular be used in a privacy window. In this case a privacy mode can be provided when desired by switching the device, in particular the window element, from a clear state with possible viewing contact to a scattering state giving a visual barrier.

The devices may suitably and advantageously adopt the different optical states using electrical switching, where the application of voltage controls the switching. For example, liquid crystal-based devices in principle employ a change in the orientation of liquid crystal molecules between two conductive electrodes by applying an electric field which results in a change of the transmittance.

Owing to the intrinsic capability to generate contrast by switching between the optical states, in addition to regulating the light transmission the devices may also be useful to display information or signs such as text, symbols, logos, trademarks or simple graphics. Given the switchability, such displaying of information can occur on demand as desired. In particular, in one of the optical states the device may appear homogeneous over the entire area, while in another optical state a desired pattern or image is visible. The contrast may be chosen depending on whether the device is configured as normally bright/clear or as normally dark/scattering.

A manner in which such images may be generated is to predetermine a pattern which is not addressed, i.e. which is not electrically contacted or respectively is electrically insulated, such that this insulated segment remains in a given optical state while the rest of the device can undergo switching and thus change optical states and appearance. In particular, by patterning at least one of the electrodes such inactive, non-switchable areas can be formed in the device. WO 2016/116120 A1 describes a switchable device having a segmented structure wherein in one of the electrode layers electrically insulated sections are provided by spatially selective removal of the electrode material made of indium tin oxide.

Considering that the electrically insulated areas are inactive and thus remain in the given initial state, a complication in terms of the electrical contacting arises in the case where the desired electrode pattern, in particular the electrically insulated segment, includes a closed feature, i.e. a feature which entirely encloses or embeds an area which should be active or switchable. Examples of such patterns containing closed hollow shapes or loops, i.e. patterns which enclose island areas, include the contours of circles or polygons, letters such as A, a, B, b, D, d, e, g and so on, the numerals 0, 4, 6, 8 and 9, or any other closed figure of regular or irregular shape and also nested patterns.

In order to activate the interior insular areas of such closed patterns within the electrode layer normally an electrical connection needs to be provided.

A possibility in this regard is to break the closed feature, which in particular is electrically resistive, and to provide at least one conductive bridge which connects the island area with the rest of the electrode layer. This procedure is akin to the production of a stencil, i.e. a template used to draw or paint identical letters, symbols, shapes or patterns, where sections of material inside cut-outs (stencil islands) are connected to other parts of the stencil with narrow sections which are not cut out (bridges). However, this could mean that the intended image design would not be reproduced in an accurate and faithful manner because the bridge would leave a visible gap in the otherwise closed image feature. Such a modification from an original design may detract from the intended visual appearance or aesthetics, for example in view of marketing purposes when a known branding is altered.

Another possibility is to address the island electrode area by separately contacting this segment. Such an additional contacting however requires e.g. a further lead and insulation thereof or the provision of a feedthrough through the substrate.

As an alternative, WO 2015/095615 A1 describes multi-zone electrochromic windows, where in one embodiment four individual electrochromic lites each configured with a resistive zone, essentially forming four quadrants, are arranged so that when coloured the letter "O" is displayed.

As another alternative, U.S. Pat. No. 3,588,225 describes a device comprising two electro-optical cells arranged in tandem for displaying varying patterns consisting of concentric circles, where each cell has one continuous electrode and one patterned electrode array.

There is still a need in the art for switchable electro-optical devices which are useful for regulating light transmission and in addition for displaying information, in particular images containing closed image features, and which are based on an efficient configuration. There is also a need in the art for a suitable and robust process to produce such switchable devices.

SUMMARY OF THE INVENTION

An object of the present invention is therefore to provide improved electrically switchable devices, in particular devices which in one optical state are capable of portraying closed patterns or images, which exhibit the desired switching and displaying capabilities while having benefits in terms of a simple cell design and ease of electrical contacting. Another object is to provide a facile and reliable method for preparing said devices. Further objects of the present invention are immediately evident to the person skilled in the art from the following detailed description.

The objects are solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above objects and eventually provide additional advantages.

A first aspect of the present invention provides a method for the preparation of an optical device which is operable in and electrically switchable between at least two optical states, wherein the method comprises the following steps
  providing a first transparent substrate supporting a first electrode and a second transparent substrate supporting a second electrode,
  wherein each of the first electrode and the second electrode is a patterned electrode, wherein at least one predetermined resistive portion being void of any conductive material is arranged in an otherwise continuous layer of a transparent conductive material such that at least one electrically insulated segment having a predetermined shape is formed on each substrate, and
  configuring an electro-optical cell including the first patterned electrode as arranged on the first transparent substrate and the second patterned electrode as arranged on the second transparent substrate and disposing between said substrates with said electrodes a medium capable of modulating light in response to an applied voltage.

It is in particular preferred that the respective electrically insulated segments have open shapes which correspond to complementary parts of a desired pattern having at least one closed feature and which are arranged in relation with each other on the substrates and that the substrates are aligned with respect to one another in a manner such that an image having at least one closed feature is portrayable by the optical device in one of the optical states.

It has surprisingly been found that the present method can produce switchable electro-optical devices having a simple and robust configuration which in addition to regulating the transmission of light can also be used to display information, in particular images containing closed image features. The method provides a facile and efficient procedure for obtaining the improved devices, including ease of electrical contacting.

The devices can suitably adopt at least two different optical states in dependence on the application of a voltage, and they are thus useful to control the transmission of light. In this respect, light in particular refers to electromagnetic radiation in the spectral range from 380 nm to 780 nm. The light transmission may be modulated for example by switching the device from a bright state into a dark state and vice versa, or respectively from a clear state to a scattering state and vice versa.

Preferably, in the bright state the device according to the invention has a degree of visible light transmission, determined in accordance with DIN EN410, of more than 30%, more preferably more than 40%, and even more preferably more than 50%. Preferably, in the dark state the device according to the invention has a degree of visible light transmission, determined in accordance with DIN EN410, of less than 25%, more preferably less than 20%, and even more preferably less than 15%.

Preferably, in the clear state the device according to the invention gives a haze, determined according to ASTM D 1003, of less than 15%, more preferably less than 10% and in particular less than 5%. Preferably, in the scattering state the device according to the invention preferably gives a haze, determined according to ASTM D 1003, of more than 75%, more preferably more than 85%, even more preferably more than 90%.

In the method according to the invention a medium capable of modulating light in response to an applied voltage is interposed as a layer between the two opposing transparent substrates, in particular forming a layer in the electro-optical cell. The electro-optical cell thus has a configuration comprising two walls, in particular the two transparent substrates, which are spaced apart and which are both provided with the patterned electrodes, wherein the cell contains the light modulation material.

The medium according to the invention is electrically active or responsive, in particular in response to the presence or respectively absence of an electric field, which forms the basis for the electrical switchability and the regulation of the light transmission of the device. The medium can preferably be selected from a liquid-crystalline medium, in particular a dichroic dye-doped liquid-crystalline medium, an electrochromic medium and a medium comprising suspended particles.

It has presently been recognized that the medium is activated, or at least primarily activated, only in regions of overlap of the electrodes which are provided on opposite sides of the layer comprising the medium.

By providing patterned electrodes, in particular electrodes which contain predetermined electrically resistive portions or zones, it is possible to preselect device regions which remain inactive and non-switchable regardless of the switching status of the rest of the device area. The electrode pattern in particular includes portions which are void of any conductive material, and these electrically resistive segments are thus distinguished from the rest of the electrode layer which is conductive. The patterned electrodes therefore constitute structures which are non-uniform in that electrically resistive openings or spaces are included in an otherwise continuous layer of conductive material. Herein, an otherwise continuous layer of transparent conductive material therefore means that absent the formed resistive portion(s) the layer would be continuous or uniform.

The resistive portions can yield electrically insulated areas, in particular electrically insulated segments having a predetermined shape, on the substrates, leading to regions or zones in the medium layer of the electro-optical cell which cannot be activated and thus remain non-switchable.

An electrically insulated segment may exclusively consist of resistive portions and in this case is insulated per se because no conductive material is present in the entire segment. It is however also possible that an electrically insulated segment is formed by providing the resistive portion only as a contour line which encloses conductive material. In this case the enclosed conductive material is also electrically insulated because no electrical contacting and no voltage source are applied to this enclosed conductive material. The electrically insulated segment in this alternative thus includes the restive portion and the enclosed non-contacted area which still contains conductive material. It is also possible to combine sub-areas with resistive contour lines and enclosed conductive material with sub-areas which are fully void of conductive material. It is furthermore possible to use resistive contour lines where in addition further resistive lines are provided which emanate from the contour lines inwards into the enclosed areas and which may optionally even traverse enclosed segments.

According to the present invention, on both substrates electrode patterns are disposed in relation with each other to produce a composite pattern corresponding to the desired image, in particular the closed image, to be displayed. Based on the alignment of suitable corresponding segmented or partitioned electrode patterns formed on the two substrates as sub-features, the electro-optical device obtained from the present method is therefore especially useful to display images having island features.

In this respect, a closed pattern, in particular a composite or superimposed closed pattern, and an image having at least one closed feature refer to patterns and images which appear to have no gap when arranged in the electro-optical cell, in particular when considering a plan view of the device or even a view which is somewhat off-axis. In accordance with the present invention, desired designs of closed patterns which enclose island areas, such as contours of circles or polygons, letters such as A, a, B, b, D, d, e, g and so on, the numerals 0, 4, 6, 8 and 9, or any other closed figure of regular or irregular shape and also nested patterns, are initially decomposed or partitioned as pairs of suitable open sub-structures and arranged respectively on the two substrates, and subsequently essentially recomposed or paired as a composite ensemble by assembling and thus superimposing the substrates supporting the respective electrode patterns in the electro-optical cell. This matching of the patterned electrodes on both substrates results in a device which can portray an image which appears to have no visible gaps in the intended closed feature, even though the actual individual electrode patterns are only present in the form of deconstructed or fragmented sub-segments.

The device can thus be used to portray closed images, i.e. images having closed hollow shapes or features. The image is formed based on predetermined electrode patterns, where on each substrate the electrodes define a pattern which corresponds to an open portion of the desired complete or respectively composite image pattern. The individual patterns on each substrate are open in the sense that they themselves do not contain closed features. Therefore, in the method electrically insulated segments having open shapes are provided which correspond to complementary parts of a desired overall pattern.

In particular, a first part of the entire pattern structure is provided on the first substrate, while the corresponding remaining part is provided on the second substrate. The parts are arranged on the substrates and the substrates are aligned such that the image given by the composite of these patterns appears as complete, especially as completely closed with respect to the desired closed feature.

The substrates are arranged with respect to one another in a manner such that in operation, in particular in one of the optical states, the device can portray the desired closed image. In this respect, the patterns on the substrates are matched or mated such that no visible gaps appear in the image. Considering a viewer or user having a plan view of the device, i.e. being perpendicular to the device surface or area, this closed appearance can be achieved by aligning the corresponding feature edges in a flush manner. In order to allow for off-axis viewing and/or for some larger degree of error margin in the device specification and assembly and/or for the avoidance of possible fringe field effects, it is also possible and in some cases preferred that the segmented patterns slightly overlap. This way it may be further ensured that the closed image feature appears seamless. However, perpendicular to such edges with possible pattern overlap the alignment should be well matched which ensures a seamless continuation of image contours.

The electro-optical device can thus portray closed images utilizing the capability of the device to also activate and thus switch the corresponding enclosed features. In particular, this capability is based on the provision of patterned electrodes on both substrates, wherein the patterns include electrically insulated segments having open shapes. Owing to the open shapes, it is possible to also address and activate directly the interior insular areas of the closed patterns without the need for an additional electrical connection. This means that despite the patterning of the electrodes simple electrical contacting can be used, e.g. by applying busbars on one or more edges or respectively areas adjacent to the edges of the electrode layers. Such application of busbars may be further facilitated by configuring the electro-optical cell in a staggered arrangement where edge areas of the substrates do not overlap. The electrodes may thus be connected to an external voltage source in a facile manner, thereby providing electrical means for applying an electric field through the light modulation medium in the desired areas with ease.

The method according to the invention thus gives benefits both in terms of the processing as well as the obtainable product properties.

Therefore, in another aspect of the invention a switchable optical device is provided which is obtained by or respectively obtainable from carrying out the method according to the invention.

Another aspect of the invention relates to an optical device which is operable in and electrically switchable between at least two optical states having a layer structure comprising in this order a first transparent substrate,
a first patterned electrode,
a switching layer comprising a medium capable of modulating light in response to an applied voltage,
a second patterned electrode, and
a second transparent substrate,
wherein the electrodes are patterned such that at least one electrically insulated segment having a predetermined shape is formed on each substrate, and wherein the substrates are aligned and the electrically insulated segments are arranged in a manner such that an image having at least one closed feature is portrayed by the optical device in one of the optical states.

In the present invention an advantageous electrically switchable device is provided which in addition to regulating the transmission of light is also capable of portraying closed image features in one of the optical states. In this respect, the desired switching and displaying capabilities can be achieved while at the same time favourably benefits in terms of a simple cell design and ease of electrical contacting are realized. In the device and in particular in the electro-optical cell the complementary patterns in the electrodes on the two substrates are arranged and matched with respect to each other to obtain a superimposed composite pattern which gives the desired image in one of the switching states.

The optical device comprising the electro-optical cell according to the invention allows light to pass through it in a controlled manner. It can be favourably used and included in windows, glazing units, including insulating glazing units, facade elements, room dividers, separating walls and the like.

Therefore, in another aspect of the invention a window is provided which comprises the optical device according to the invention.

Without limiting the present invention thereby, in the following the invention is illustrated by the detailed description of the aspects, embodiments and particular features, and particular embodiments are described in more detail.

According to the present invention in the optical device an electro-optical cell is configured which includes two substrates each supporting a patterned electrode. In this respect, electrically resistive portions or zones are included which interrupt an otherwise contiguous layer of conductive material, preferably ITO. The resistance provided by these resistive portions between the conductive material preferably is larger than 1 MΩ, more preferably larger than 10 MΩ, and particularly preferably larger than 50 MΩ. These resistive portions are arranged such as to form electrically insulated segments. In principle, such segments may be formed in different ways.

In a first embodiment, the resistive portions are formed only as contours, in particular contour lines or edges, of the electrically insulated segment. These contours thus enclose an area which may still comprise conductive material. However, given the absence of any extra electrical contacting, the provision of the resistive portions leads to the electrical insulation of the entire segment. In this manner an open pattern may be defined, which is however electrically insulated or respectively not contacted by forming a closed contour at the pattern edge.

Typical line widths in such cases range from 10 µm to 2 mm, preferably 100 µm to 1 mm, while the typical layer thickness of the electrodes, in particular ITO, ranges from 5 nm to 250 nm.

In another embodiment, the desired pattern of the electrically insulated segment is entirely void of any conductive material. This means that in this case the electrically resistive portion corresponds to the entire electrically insulated segment. This kind of patterning may be applied to only one substrate or also to both substrates. For example, one substrate may have an electrode where the insulated segment(s) have no conductive material at all, while on the second substrate only resistive contours are provided which thus define the insulated segment(s).

In a further embodiment, on at least one of the substrates, preferably on both substrates, resistive portions are provided which comprise contours as well as larger resistive zones in different parts. Preferably, these larger zones which are electrically resistive are especially formed at the edges or areas where the electrode patterns of the two substrates are superimposed. Thus, in the electrically insulated segment of at least one of the substrates, preferably of both substrates, an extended sub-segment at the edge is void of any conductive material. However, in other parts of the pattern further removed from the overlap region it may be more efficient or economical to only use contours.

In another embodiment, in particular in case laser ablation is used to generate resistive portions, it is possible to combine resistive contour lines with further lines which emanate from the contour lines and proceed into the enclosed areas. Different line structures or patterns may be applied. For example, the emanating lines may be discontinued in the enclosed areas, forming e.g. an interdigitation pattern. It is also possible to apply resistive lines which traverse or cross enclosed areas in a continuous manner such that they emanate from and at the other end again connect to a contour line. Suitable or preferred patterns may include sets of non-intersecting lines and arrays of mesh-like or grid-like line structures.

The substrates are aligned such that complementary edges of the respective electrically insulated segments are matched or slightly overlap and the desired closed pattern feature and the resulting image appear without gap, in particular when viewed perpendicular to the device surface. A slight overlap in the superposition may give some ease in terms of error margins and can also be beneficial in terms of possible off-axis viewing of the device. In case of such overlap, it is preferred that at least one of the insulated segments, more preferably both insulated segments, are completely void of any conductive material in the areas in and adjacent to this overlap zone.

Electrical switching in accordance with the invention is achieved by providing the transparent substrates, e.g. glass substrates or plastic substrates, with electrodes. In particular, electrically conductive layers are provided on the substrates, wherein the conductive layers comprise or are formed of a transparent conductive material, e.g. a transparent conductive oxide, preferably indium tin oxide (ITO), $SnO_2$:F or doped zinc oxide, in particular ITO, or a conductive polymer such as poly(3,4-ethylenedioxythiophene) (PEDOT), poly(3,4-ethylenedioxythiophene) polystyrene sulfonate (PEDOT:PSS) or poly(4,4-dioctyl cyclopentadithiophene), or a thin transparent metal and/or metal oxide layer, for example silver. It is preferred that the transparent conductive material is a transparent conductive oxide, more preferably indium tin oxide. In addition, as described herein above and below, the electrodes are patterned to also provide resistive portions or zones on both substrates.

The electrically conductive layers are provided with electrical connections, in particular busbars. The voltage is preferably supplied by a battery, a rechargeable battery, a supercapacitor or an external current source, more preferably by an external current source. In this respect, bonding of a terminal to a busbar may be achieved by soldering, welding, or use of a conductive adhesive or a conductive film. In particular, anisotropic conductive film bonding may be used to bond a flat cable as a terminal wire to the respective busbar. The terminals may be used to provide a connection to a controller or driver which generates a driving signal for controlling the state of the switchable medium located inside the electro-optical cell. The terminal may, for example, be configured as a terminal wire or a connector for attaching a wire.

It is preferred that the two substrates of the switchable optical device are arranged such that each of the substrates has at least one region which does not overlap with the other substrate. These non-overlapping regions thus can provide access to the respective transparent electrode and the busbars may be conveniently placed in these non-overlapping regions. The non-overlapping region is preferably an offset between the first and second substrate which is in the range of from 1 mm to 20 mm, preferably from 2 mm to 10 mm and for example about 4 mm.

The light-modulating, electro-responsive medium is preferably arranged as a switching layer. It is preferred that this switching layer is provided with a predetermined layer thickness.

Preferably, the medium capable of modulating light in response to an applied voltage is a liquid-crystalline medium, more preferably a dichroic dye-doped liquid-crystalline medium, an electrochromic medium or a medium comprising suspended particles.

Depending on the medium, electric voltage may be provided as direct current (DC) voltage or as alternating current (AC) voltage. For liquid-crystalline media, it is preferred to use AC electric fields, for example using frequencies of 50 Hz or 60 Hz. The state of the LC medium may thus be controlled by applying an AC driving voltage to the two transparent electrodes.

A transparent electrode is an electrically conductive layer which allows at least partial transmission of visible light through the material. The transparency may be wavelength dependent such that only certain wavelengths or wavelength ranges of light are transmitted through the transparent electrode. In this case, light passing through the transparent electrode will have a colored appearance. The light transmission through the transparent electrode may also be uniform in the visible wavelength range so that light passing through the transparent electrode has a gray or white appearance. Preferably, the visible light passing through the transparent electrode is not scattered. The transparent electrode is preferably applied to the substrate by a coating process. For example, ITO may be sputtered to typically obtain a layer thickness in the range of from 5 nm to 250 nm or a sheet resistance in the range of from 5Ω/□ to 500Ω/□.

In a preferred embodiment, the switchable optical device is a liquid crystal (LC) device, preferably selected from modes based on either LC-dye mixtures/LC without dyes and modes described by geometry of twisted nematic, super twisted nematic, planar or vertical ECB nematic, Heilmeier, vertically aligned, twisted vertical aligned, highly twisted nematic, polymer stabilized cholesteric texture (PSCT), polymer networked liquid crystal (PNLC) or polymer dispersed liquid crystal (PDLC).

Several modes or configurations may be employed to provide a reversible transmission change from bright to dark. For example, for twisted nematic (TN), super-twisted nematic (STN) and vertical alignment (VA) liquid crystal cells polarizers are used to control the light transmission. It is also possible to use guest-host liquid crystal cells which are based on a liquid crystal host which is doped with dichroic dye molecules. These guest-host systems can be used without any polarizers to alter the light transmission. However, in some embodiments and applications guest-host liquid crystal cells are used in combination with at least one polarizer.

When dichroic dye-doped liquid-crystalline media are used, depending on the dye composition, it may be possible to generate images and image contrast which includes the deliberate exploitation of colour and colour effects.

Dichroic dyes may preferably be selected from for example azo dyes, anthraquinones, methine compounds, azomethine compounds, merocyanine compounds, naphthoquinones, tetrazines, pyrromethene dyes, malononitrile dyes, rylenes, in particular perylenes and terylenes, thiadiazole dyes, thienothiadiazole dyes, benzothiadiazoles, thiadiazoloquinoxalines, pyrromethenes and diketopyrrolopyrroles.

LC-based optical devices using light scattering include so-called polymer dispersed liquid crystal (PDLC) or encapsulated or nematic curvilinear aligned phase liquid crystal (NCAP), polymer network liquid crystal (PNLC), cholesteric liquid crystal (CLC), polymer stabilized cholesteric texture liquid crystal (PSCT) and dynamic scattering liquid crystal devices. These scattering-type devices can be switched between a transparent state, i.e. an optically clear or non-hazy state, and a light scattering state, i.e. a translucent or hazy state.

The liquid-crystalline medium may be included in the electro-optical cell in a suitable manner, for example using vacuum filling or one drop filling. Typically, edge sealants are provided to close the cell or respectively contain the medium. Examples of suitable materials for sealing of the cell include epoxy based sealants, polyurethanes, hot melt sealants and acrylates.

The substrates may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose). In a particularly preferred embodiment glass substrates are used.

The switchable optical device may include further functional layers such as, for example, a UV blocking layer, colour filters, alignment layers and/or polarizers. In an embodiment, at least one polarization layer and optionally at least one retardation layer is provided in the optical device.

For LC-based electro-optical cells, optionally alignment layers are further provided which are in direct contact with the liquid-crystalline medium. Such alignment or orientation layers are preferably made of polyimide (PI). It is thus particularly preferred that the electrically conductive layers and orientation layers are provided together on the substrates. In this case the alignment layer is provided on top of the conductive layer such that the alignment layer is contacting the LC medium. The alignment layers, preferably polyimide layers, may be arranged such that they provide, in particular at the interface, homogeneous or planar orientation or alternatively homeotropic orientation of the molecules of the liquid-crystalline medium. In a particular embodiment rubbed polyimide is used on both substrates having a difference in direction of 90° as used in the so-called twisted nematic (TN) geometry.

In a particular embodiment alignment layers with pre-tilt angles are used, e.g. having pre-tilt angles ranging from 0° to 20° for the TN geometry or from 80° to 90° for the vertically aligned (VA) geometry.

Preferably, the electro-optical cell is configured such that the electrodes arranged on the substrates both face inwards, i.e. they each face towards the medium. The electrodes are arranged as transparent conductive layers and supported on the substrates. It is also possible to provide passivation or barrier layers on the substrates, alternatively but also in addition to orientation layers, e.g. passivation layers comprising silicon oxide or silicon nitride, preferably consisting of silicon oxide or silicon nitride. In case both a passivation layer and an orientation layer are provided on a substrate they are arranged such that the orientation layer is topmost, i.e. is contacting the LC medium.

It is preferred that the transparent conductive layers are respectively embedded between two transparent dielectric layers. Therefore, according to a particularly preferred embodiment in the optical device a liquid-crystalline medium is provided in a switching layer, wherein the switching layer is sandwiched between and in direct contact with a first alignment layer and a second alignment layer, and wherein preferably the electrodes are respectively arranged on a passivation layer and in particular are embedded between two transparent dielectric layers.

In the optical device, in particular in the case of an LC-based optical device, the medium layer as provided in the method and the switching layer as used in the device according to the invention preferably have a thickness in the range from 1 µm to 100 µm, more preferably from 2 µm to 50 µm, even more preferably from 4 µm to 40 µm and in particular from 10 µm to 25 µm.

To maintain a proper thickness of the switching layer, spacers may be included within the cell gap of the switching layer. Typically, the spacers have a spherical shape with a diameter in the range of the cell gap. For example, non-conductive spacers having a spherical shape with a predetermined diameter made of polymer or glass may be used. In some embodiments it may be useful to provide sticky spacers, i.e. spacers which have some intrinsic adhesive characteristic to better adhere to the surface. It may also be useful to use black spacers, e.g. to avoid or minimize undesired light leakage. It can be especially beneficial to use spacers which are black and sticky. Alternatively, the cell thickness may be set or maintained by other suitable means, e.g. by using column spacers. The column spacers may also be formed to give compartments, thus optionally allowing for free-cuttable structures.

The patterning of the electrode material, preferably a transparent conductive oxide and in particular ITO, and the provision of electrically resistive portions may in principle be performed by any suitable method.

In an embodiment the patterned electrodes are prepared using a subtractive process. In this process part of the conductive material, in particular ITO, is selectively removed from the continuous layer of conductive material, wherein the layer is deposited on the substrate in a previous step. This selective removal leads to the formation of the predetermined resistive portions. The conductive material may be removed mechanically, e.g. by grinding, physically or chemically. It is preferred to use laser ablation, wet etching or dry etching. In a particularly preferred embodiment laser ablation using an excimer laser, which is especially useful to define and form the electrically resistive contours for the insulated segments.

In another embodiment the patterned electrodes are prepared using an additive process. In this process the conductive material is selectively deposited in a manner to form patterns comprising the predetermined resistive portions. Preferred methods for such selective deposition include using physical vapour deposition, in particular sputtering, or chemical vapour deposition using masking, spin coating or printing, in particular inkjet printing.

The electrodes on each substrate can be patterned separately, and the electro-optical cell is preferably assembled subsequently to the patterning step.

The optical device can be used as an element of a window, thus providing an electrically switchable window. It is preferred that the window contains precisely one optical device. It is furthermore preferred that the optical device contains precisely one switching layer. Alternatively, it is also possible to use a so-called double cell configuration in which two switching layers are used. In this case, it is however also the arrangement of a single cell as described herein which produces the image having a closed feature.

The optical device may comprise further sheets, in particular glass sheets, which are bonded to the first and/or second substrate. Bonding can be achieved using for example lamination or an adhesive such as an optically clear adhesive.

In a preferred embodiment the liquid-crystalline medium as used in the present invention has a positive dielectric anisotropy $\Delta\varepsilon$ of $\geq 1.5$, preferably in the range of from 1.5 to 50, more preferably from 3 to 40, and even more preferably from 3 to 30.

According to another embodiment the liquid-crystalline medium as used in the present invention has a negative dielectric anisotropy, preferably in the range from $-2$ to $-8$, more preferably in the range from $-3$ to $-6$, and particularly preferably from $-3.5$ to $-5$.

All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The dielectric anisotropy ($\Delta\varepsilon$) is determined at a frequency of 1 kHz. The optical anisotropy ($\Delta n$) is determined at a wavelength of 589.3 nm.

The liquid-crystalline medium as used in the present invention preferably has a clearing point, preferably a phase transition from a nematic liquid-crystalline state to an isotropic state, in the temperature range from 70° C. to 170° C., more preferably from 80° C. to 160° C., even more preferably from 90° C. to 150° C. and in particular from 100° C. to 140° C.

The switchable optical device preferably has a size of greater than $0.1\ m^2$, more preferably greater than $0.5\ m^2$, even more preferably greater than $1\ m^2$, and still more preferably greater than $3\ m^2$. In an embodiment the optical device has an area in the range of $0.25\ m^2$ to $15\ m^2$, and more preferably in the range of $0.5\ m^2$ to $10\ m^2$.

The device and in particular the window may have different shapes, e.g. square, rectangular, triangular or polygonal.

In the following drawings are described which further illustrate the present invention.

BRIEF DESCRIPTION OF THE DRAWINGS

The drawings show.

DETAILED DESCRIPTION OF THE INVENTION

Figure 1:
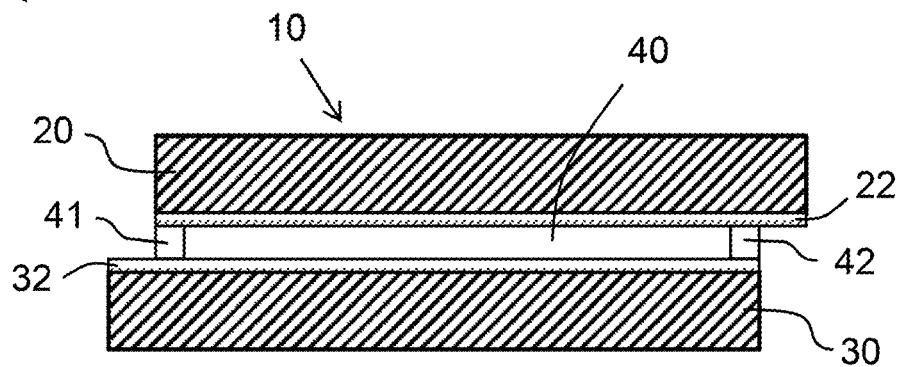
FIG. 1 shows a cross-sectional view of a switchable optical device.

FIG. 1 shows a cross section of an optical device 10 which is operable in and electrically switchable between at least two optical states, where the device has a first transparent substrate 20 and a second transparent substrate 30. A medium 40 which is capable of modulating light in response to an applied voltage, in particular a dye-doped liquid-crystalline medium, is sandwiched between the two substrates 20, 30. The medium layer is sealed by a seal 41, 42. The first transparent substrate 20, in particular a glass substrate, supports a first patterned electrode 22 and the second transparent substrate 30, in particular a glass substrate, supports a second patterned electrode 32, wherein the electrodes 22, 32 respectively face inwards. The two substrates 20, 30 are arranged in a staggered or offset manner such that a region of the first substrate 20 does not overlap with the second substrate 30 and that a region of the second substrate 30 does not overlap with the first substrate 20.

In an embodiment it is also possible to further provide passivation layers and alignment layers on the substrate.

Figure 2A:
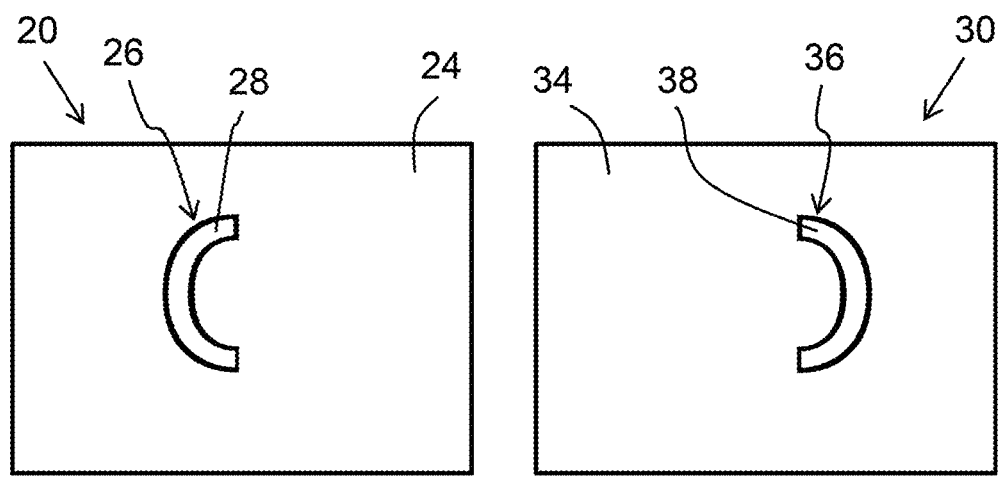
FIG. 2*a* shows plan views of electrode patterns on two substrates, where one pattern is shown with the face up and the other pattern is shown with the face down.

FIG. 2a shows in top view two substrates 20, 30 on which a transparent conductive material 24, 34, in particular ITO, as the electrode material is deposited. The substrates 20, 30 carry complementary open-shaped patterns which in composite represent the letter "O", wherein on the first substrate 20 a resistive portion 26 is formed as a closed contour of a first semicircle-like pattern including an electrically insulated segment 28 and on the second substrate 30 a resistive portion 36 is formed as a closed contour of a corresponding second semicircle-like pattern including an electrically insulated segment 38. The first substrate 20 is shown with the electrode layer facing down and the second substrate 30 is shown with the electrode layer facing up, which corresponds to the intended arrangement of a top substrate and a bottom substrate where the electrodes are facing inwards and towards each other.

Figure 2B:
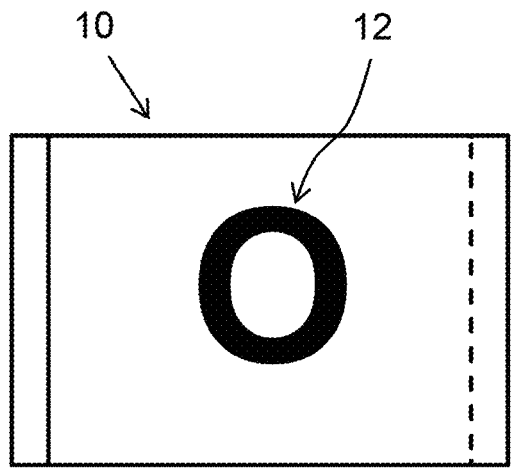
FIG. 2*b* shows a plan view of an optical device assembled using the substrates shown in FIG. 2*a* which in a bright state displays an image having a closed feature.

FIG. 2b shows a plan view of an optical device 10 which is assembled using the substrates 20, 30 shown in FIG. 2a and which sandwiches the medium 40, in particular a dye-doped liquid-crystalline medium. The switchable device 10 is electrically switchable between a bright state and a dark state, wherein the unpowered fail-safe mode is configured as normally dark. In the bright switching state the electrically activated or responsive areas have a high transmittance, while the inactive region of the device defined by the electrode patterns remains unswitched and thus dark. This way in the bright state an image having at least one closed feature 12, in particular a dark letter "O", is visible where the image appears without any gaps or bridges. This is achieved by matching and corresponding alignment of the patterns. In the dark state, however, the image, i.e. the letter "O", is not discernible, and the device appears as homogeneously dark. Owing to the staggered or offset arrangement of the substrates 20, 30, the device 10 may be conveniently provided with electrical contacts, e.g. busbars.

Figure 3A:
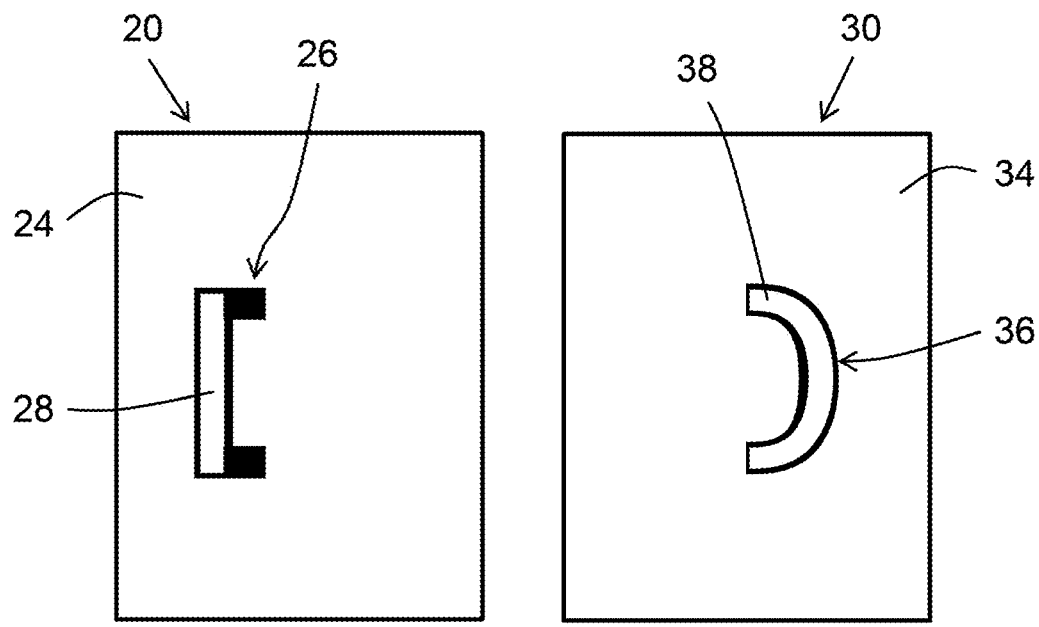
FIG. 3*a* shows plan views of further electrode patterns on two substrates, where one pattern is shown with the face up and the other pattern is shown with the face down.

FIG. 3a shows in top view two substrates 20, 30 on which a transparent conductive material 24, 34, in particular ITO, as the electrode material is deposited. The first substrate 20 is shown with the electrode layer facing down and the second substrate 30 is shown with the electrode layer facing up. Resistive portions 26, 36 are formed on each substrate, which by the intended matching and superposition yield a composite electrode pattern giving an image of the letter "D". In this case, the resistive portion 36 on the second substrate 30 is formed as a closed contour of a semicircle-like pattern which includes an electrically insulated segment 38 which consequently has an arch-like area, while the resistive portion 26 formed on the first substrate 20 is arranged as a combination of two distinct implementations. In particular, the vertical bar structure is only formed as a contour including an electrically insulated segment 28 which still comprises conductive material, whereas the two short horizontal bars are fully void of any conductive material. These horizontal bars form the edge areas at which the complementary semicircle-like pattern on the other substrate 30 is to be mated or even overlapped.

In an embodiment it is possible to also have no conductive material present in the sub-areas forming the extreme ends of the semi-circle pattern, which form the corresponding matching edges to the horizontal bars.

Figure 3B:
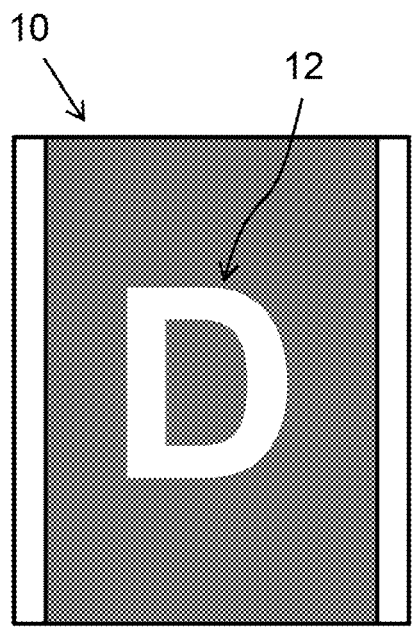
FIG. 3*b* shows a plan view of an optical device assembled using the substrates shown in FIG. 3*a* which in a dark state displays an image having a closed feature.

FIG. 3b shows a plan view of an optical device 10 which is arranged using the substrates 20, 30 shown in FIG. 3a and which sandwiches the medium 40, in particular a dye-doped liquid-crystalline medium. The switchable device 10 is electrically switchable between a bright state and a dark state, wherein the fail-safe mode is configured as normally bright. In the dark switching state as shown the electrically activated or responsive areas have a low transmittance, while the inactive region of the device defined by the corresponding electrode patterns remains unswitched and thus bright. This way in the dark state an image having at least one closed feature 12, in particular a bright or transparent image of the letter "D", is visible where the image appears without any gaps or seams. This is achieved by matching and corresponding alignment of the patterns. In the bright state, however, the image, i.e. the letter "D", is not discernible, and the device appears as homogeneously bright and without any image features. Owing to the staggered or offset arrangement of the substrates 20, 30, the device 10 may be conveniently provided with electrical contacts such as busbars.

Figure 4A:
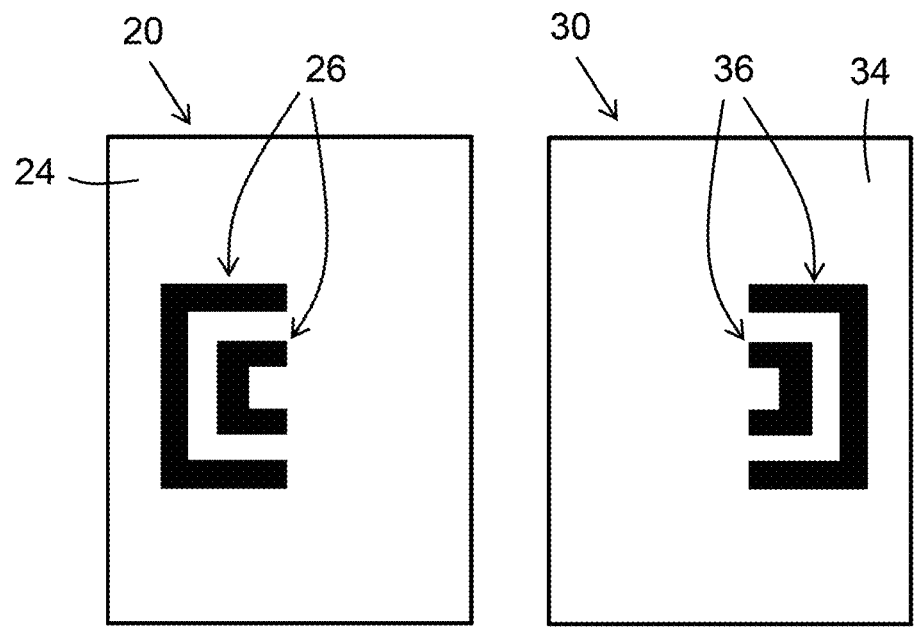
FIG. 4a shows plan views of even further electrode patterns on two substrates, where one pattern is shown with the face up and the other pattern is shown with the face down.

FIG. 4a shows in plan view two substrates 20, 30 on which a transparent conductive material 24, 34, in particular ITO, as the electrode material is deposited. The first substrate 20 is shown with the electrode layer facing down and the second substrate 30 is shown with the electrode layer facing up. Two resistive portions 26, 36 are respectively formed on each substrate, which form the left and right halves of two rectangles wherein a smaller rectangle is nested in a larger rectangle. In this case, the resistive portions 26, 36 on both substrates 20, 30 are fully void of any conductive material. This means that the segments which are electrically insulated fully correspond to or respectively are identical with the resistive portions 26, 36.

In an embodiment it is also possible to form the resistive portions 26, 36 on one or also both substrates only as contour lines or as a combination of contoured segments and sub-areas which are fully void of conductive material.

Figure 4B:
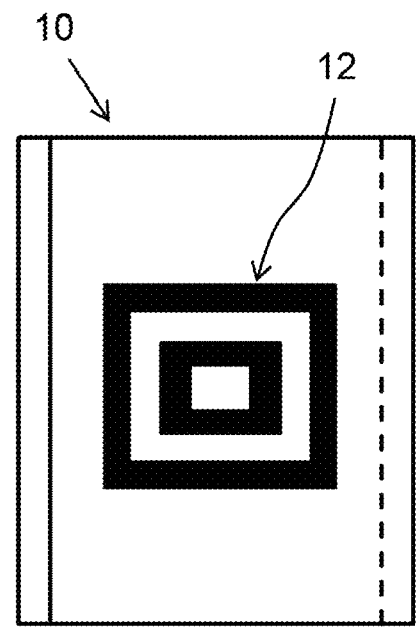
FIG. 4b shows a plan view of an optical device assembled using the substrates shown in FIG. 4a which in a bright state displays an image having closed features.

FIG. 4b shows a plan view of an optical device 10 which is assembled using the substrates 20, 30 shown in FIG. 4a and which sandwiches the medium 40, in particular a dye-doped liquid-crystalline medium. The switchable device 10 is electrically switchable between a bright state and a dark state, wherein the fail-safe mode is configured as normally dark. In the bright switching state as shown the electrically activated or responsive areas have a high transmittance, while the inactive region of the device defined by the electrode patterns remains unswitched and thus dark. This way in the bright state an image having at least one closed feature 12, in particular two rectangle where the smaller rectangle is nested in the larger rectangle, is visible where the image appears without any gaps or seams. This is achieved by matching and corresponding alignment of the open-shaped patterns. In the dark state, however, the image is not discernible, and the device appears as homogeneously dark without any image. Owing to the staggered or offset arrangement of the substrates 20, 30, the device 10 may be conveniently provided with electrical contacts, e.g. busbars.

While in FIGS. 2b, 3b and 4b only simple images have been used exemplarily, in further embodiments it is possible and in many cases preferred to display images comprising several letters, numerals, characters or signs, e.g. words, trademarks or texts, etc., wherein preferably at least one of these signs has a closed feature. The patterning of the conductive layers as described herein can provide such multiple shapes also with ease and in a straightforward manner.

The following example is merely illustrative of the present invention and it should not be considered as limiting the scope of the invention in any way.

The example and modifications or other equivalents thereof will become apparent to those skilled in the art in the light of the present disclosure.

Example

Two sheets of ITO-coated glass (400 mm×400 mm×4 mm ITO layer thickness of 25 nm) are obtained commercially. The ITO coatings are treated by laser ablation as follows in order to obtain patterned electrodes, in particular electrically resistive portions defining electrically insulated segments.

An excimer laser (Coherent, LPXpro 240) is used with an intensity of 400 mJ/cm$^2$ with a spot size of 100 μm×100 μm. Respective lines are ablated on the two substrates to form the contour lines of corresponding left and right halves of a square with a feature width for the insulated segments of 20 mm where the vertical bar sections each have a length of 200 mm and the horizontal bar sections each have a length of 105 mm, allowing for an overlap region of 10 mm in the horizontal direction.

After washing the two sheets with deionized water, polyimide (JSR, rubbed, TN configuration) is applied on the ITO coatings. Subsequently, the two substrates are arranged as a cell with a cell gap of 25 μm using spacers and apart from the filling ports the perimeter is sealed, where the substrates are offset on two sides by 5 mm and where the patterned ITO coatings and the polyimide layers are respectively facing inwards. Placement and alignment of the respective patterns is carried out in reference to the edges and corners of the substrates and an overlap of 10 mm in the direction along the alignment edge is provided in the pairing of the substrates.

The cell is filled with a dichroic dye-doped liquid-crystalline medium by vacuum filling, where the LC host mixture has a clearing point of 114.5° C., a dielectric anisotropy $\Delta\epsilon$ of 10.5 and an optical anisotropy $\Delta n$ of 0.134 (corresponding to mixture H-2 as described in WO 2014/135240 A2 on page 28) and where three different azo dyes are added to the LC host mixture, in particular 0.11% by weight of dye D1, 0.15% by weight of dye D2 and 0.23% by weight of dye D3, wherein the dyes D1, D2 and D3 are as shown on page 29 of WO 2014/135240 A2. Subsequently the filling ports are sealed.

Busbars are soldered on the offset areas on each substrate and connected to an external power source by wires.

In the bright state of the device a hollow black square is displayed which appears without any visible gaps in the closed feature, while the dark state gives a uniform black appearance.

REFERENCE NUMERALS 10 optical device
12 image having at least one closed feature
20 first transparent substrate
22 first patterned electrode
24 transparent conductive material
26 resistive portion
28 electrically insulated segment
30 second transparent substrate
32 second patterned electrode
34 transparent conductive material
36 resistive portion
38 electrically insulated segment
40 medium capable of modulating light in response to an applied voltage
41 seal
42 seal

The invention claimed is:

1. A method for preparation of a window comprising an optical device which is operable in and electrically switchable between at least two optical states, the method comprising:
providing a first transparent substrate supporting a first electrode and a second transparent substrate supporting a second electrode,
wherein each of the first electrode and the second electrode is a patterned electrode, wherein at least one predetermined resistive portion being void of any conductive material is arranged in an otherwise continuous layer of a transparent conductive material such that at least one electrically insulated segment having a predetermined shape is formed on each substrate, and
configuring an electro-optical cell including the first patterned electrode as arranged on the first transparent substrate and the second patterned electrode as arranged on the second transparent substrate and disposing between said substrates with said electrodes a medium capable of modulating light in response to an applied voltage,
wherein the first transparent substrate and the second transparent substrate of the optical device are arranged such that a region of the first transparent substrate does not overlap with the second transparent substrate, and a region of the second transparent substrate does not overlap with the first transparent substrate,
wherein respective electrically insulated segments have open shapes which correspond to complementary parts of a desired pattern having at least one closed feature and which are arranged in relation with each other on the first and second transparent substrates,
wherein the first and second substrates are aligned with respect to one another in a manner such that an image having at least one closed feature is portrayable by the optical device in one of the optical states, wherein the first and second transparent substrates are aligned such that complementary edges of the respective electrically insulated segments are matched or slightly overlap and the desired closed pattern feature appears without gap, and wherein the optical device has a size greater than 1 m$^2$.

2. The method according to claim 1, wherein the at least one resistive portion is formed only as contour lines of the at least one electrically insulated segment.

3. The method according to claim 1, wherein in the electrically insulated segment of at least one of the first and second transparent substrates an extended sub-segment at the complementary edge is void of any conductive material or wherein the at least one electrically insulated segment is entirely void of any conductive material.

4. The method according to claim 1, wherein the transparent conductive material is a transparent conductive oxide, preferably indium tin oxide.

5. The method according to claim 1, wherein the medium is arranged as a switching layer, preferably having a predetermined layer thickness.

6. The method according to claim 1, wherein the medium is a liquid-crystalline medium including a dichroic dye-doped liquid-crystalline medium, an electrochromic medium or a medium comprising suspended particles.

7. The method according to claim 1, wherein the patterned electrodes are prepared using a subtractive process, wherein material is selectively removed from a continuous layer of transparent conductive material to form the predetermined resistive portions using laser ablation, wet etching or dry etching, or laser ablation using an excimer laser.

8. The method according to claim 1, wherein the patterned electrodes are prepared using an additive process, wherein the conductive material is selectively deposited such as to form patterns comprising the predetermined resistive portions using physical vapour deposition, sputtering, or chemical vapour deposition using masking, or inkjet printing.

9. The method according to claim 1, wherein the electro-optical cell is configured such that the first and second electrodes arranged on the first and second transparent substrates both face inwards.

10. A window comprising an optical device obtained by or respectively obtainable from carrying out the method according to claim 1.

11. A window comprising an optical device which is operable in and electrically switchable between at least two optical states having a layer structure comprising in this order a first transparent substrate, a first patterned electrode, a switching layer comprising a medium configured to modulate light in response to an applied voltage, a second patterned electrode, and a second transparent substrate, wherein the first and second patterned electrodes are patterned such that at least one electrically insulated segment having a predetermined shape is formed on each of the first and second transparent substrates, wherein the first and second patterned electrodes are aligned and the electrically insulated segments are arranged in a manner such that an image having at least one closed feature is portrayed by the optical device in one of the optical states, wherein the first transparent substrate and the second transparent substrate of the optical device are arranged such that a region of the first transparent substrate does not overlap with the second transparent substrate, and a region of the second transparent substrate does not overlap with the first transparent substrate, and wherein the optical device has a size greater than 1 m$^2$.

12. The optical device according to claim 11, wherein the medium is a liquid-crystalline medium and wherein optionally the switching layer is sandwiched between and in direct contact with a first alignment layer and a second alignment layer, and wherein the first and second patterned electrodes are respectively embedded between two transparent dielectric layers.

13. The window according to claim 11, wherein the window contains precisely one optical device and the optical device contains precisely one switching layer.

* * * * *